(12) United States Patent
Walker et al.

(10) Patent No.: US 8,036,943 B2
(45) Date of Patent: Oct. 11, 2011

(54) SYSTEMS AND METHODS FOR PROVIDING TRANSFERABLE ITEM PRICES

(75) Inventors: Jay S. Walker, Ridgefield, CT (US); John M. Packes, Jr., Hawthorne, NY (US); Andrew P. Golden, New York, NY (US); Russell Pratt Sammon, Stamford, CT (US); Timothy A. Palmer, Stamford, CT (US); Terry E. Mayfield, Norwalk, CT (US); Peter Kim, Stamford, CT (US)

(73) Assignee: Walker Digital, LLC, Stamford, CT (US)

( * ) Notice: Subject to any disclaimer, the term of this patent is extended or adjusted under 35 U.S.C. 154(b) by 1421 days.

(21) Appl. No.: 11/319,848

(22) Filed: Dec. 28, 2005

(65) Prior Publication Data

US 2006/0106678 A1      May 18, 2006

Related U.S. Application Data

(63) Continuation of application No. 09/538,750, filed on Mar. 30, 2000, now abandoned.

(51) Int. Cl.
    *G06Q 30/00*  (2006.01)
(52) U.S. Cl. ....................................... 705/26.1
(58) Field of Classification Search .............. 705/26, 705/27, 26.1, 26.2, 26.25, 26.3, 26.35, 26.4, 705/26.41–26.44, 26.5, 26.61–26.64, 26.7, 705/26.8, 26.81, 26.82, 26.9, 27.1, 27.2
See application file for complete search history.

(56) References Cited

U.S. PATENT DOCUMENTS

| | | | |
|---|---|---|---|
| 4,992,940 A | 2/1991 | Dworkin | |
| 5,319,542 A | 6/1994 | King, Jr. et al. | |
| 5,515,268 A | 5/1996 | Yoda | |
| 5,592,378 A | 1/1997 | Cameron et al. | |
| 5,878,400 A | 3/1999 | Carter, III | 705/20 |
| 5,903,880 A | 5/1999 | Biffar | 705/39 |
| 5,937,391 A | 8/1999 | Ikeda et al. | 705/14 |
| 5,953,705 A | 9/1999 | Oneda | 705/5 |

(Continued)

FOREIGN PATENT DOCUMENTS

EP   0 971 302 A1   12/2000

(Continued)

OTHER PUBLICATIONS

Ihnatko, Andy Check it out. (CheckFree electronic fund transfer service), MacUser, v8, n9, p29(2), Sep. 1992.*

(Continued)

*Primary Examiner* — Naeem Haq
(74) *Attorney, Agent, or Firm* — Fincham Downs, LLC; Carson C. K. Fincham

(57) ABSTRACT

Systems and methods are provided to associate a transferable item price with a first consumer and to determine that a second consumer is entitled to purchase an item in exchange for payment of an amount based on the transferable item price. In one embodiment, the first consumer arranges to purchase an item at a first price. The merchant transmits a transferable item price code to the first consumer. The first consumer sends the transferable item price code to the second consumer, such as by including the transferable item price code in an e-mail message. The second consumer transmits the transferable item price code to the merchant to establish that he or she is entitled to purchase the item at the first price.

56 Claims, 8 Drawing Sheets

U.S. PATENT DOCUMENTS

| | | | | |
|---|---|---|---|---|
| 5,970,470 | A | 10/1999 | Walker et al. | 705/14 |
| 6,016,504 | A | 1/2000 | Arnold et al. | 709/200 |
| 6,029,141 | A | 2/2000 | Bezos et al. | 705/27 |
| 6,101,484 | A * | 8/2000 | Halbert et al. | 705/26 |
| 6,119,100 | A * | 9/2000 | Walker et al. | 705/20 |
| 6,249,772 | B1 | 6/2001 | Walker et al. | 705/26 |
| 6,269,343 | B1 * | 7/2001 | Pallakoff | 705/26 |
| 6,336,100 | B1 | 1/2002 | Yamada | 705/26 |
| 6,754,636 | B1 | 6/2004 | Walker et al. | 705/26 |
| 6,839,683 | B1 | 1/2005 | Walker et al. | 705/14 |

FOREIGN PATENT DOCUMENTS

| | | |
|---|---|---|
| WO | WO 99/03056 | 8/1999 |
| WO | WO 00/39720 | 6/2000 |

OTHER PUBLICATIONS

"The Positive Side of Infection: A Virus You'll Want to Spread", Interactive PR & Marketing News, vol. 6, No. 18, Sep. 3, 1999. 4 pp.

"Emaildirect's Stealth Marketing Strategy Keeps Company on Leading Edge of Opt-In-Market; Company's Vision of Opt-In-Marketing has Become Recognized Standard", Business Wire, Jan. 19, 2000. 3 pp.

Kathryn Balint, "The Alert Consumer", Copley News Service, Financial Pages Section, Jan. 31, 2000. 6 pp.

Monica Rogers, "Some Low-Cost Tricks to Tout Online Firm: It Doesn't Take Lots of Money to Create Buzz for a Web Site", Crain's Chicago Business, p. SB6, Feb. 14, 2000. 2 pp.

"Ebay E-Mail Auction to Friend", [online], (http://cgi3.ebay.com/aw-cgi/eBayISAPI dll?ShowEmailAuctionToFriend&item=280308801). 5 pp.

"Accompany Click and Tell (SM)", [online], (http://www.accompany.com/tell?cycle_id+151612). 3 pp.

Office Action for U.S. Appl. No. 09/538,750 dated May 4, 2006, 24 pp.

Interview Summary for U.S. Appl. No. 09/538,750, dated Dec. 28, 2005, 2 pp.

Office Action for U.S. Appl. No. 09/538,750, dated Apr. 21, 2005, 23 pp.

Office Action for U.S. Appl. No. 09/538,750, dated Oct. 19, 2004, 9 pp.

Office Action for U.S. Appl. No. 09/538,750, dated Mar. 24, 2004, 17 pp.

Office Action for U.S. Appl. No. 09/538,750, dated May 27, 2003, 12 pp.

Office Action for U.S. Appl. No. 09/538,750, dated Sep. 3, 2002, 12 pp.

* cited by examiner

| TRANSACTION IDENTIFIER 402 | CONSUMER IDENTIFIER 404 | TRANSFERABLE ITEM PRICE 406 | ITEM IDENTIFIER 408 | ITEM DESCRIPTION 410 | TRANSFERABLE ITEM PRICE CODE 412 |
|---|---|---|---|---|---|
| T-0001 | C-11111 | $20.00 | SWE-6677 | BLUE SWEATSHIRT | TR-12345 |
| T-0002 | C-22222 | $30.00 | MOD-9999 | 56K MODEM | TR-98765 |
| T-0003 | C-1111 | $40.00 | BAT-0000 | BASEBALL BAT | TR-56789 |

FIG. 4

| TRANSACTION IDENTIFIER 502 | CONSUMER IDENTIFIER 504 | TRANSFERABLE ITEM PRICE 506 | ITEM IDENTIFIER 508 | ITEM DESCRIPTION 510 | SECONDARY CONSUMER IDENTIFIER(S) 512 |
|---|---|---|---|---|---|
| T-0001 | C-11111 | $20.00 | SWE-6677 | BLUE SWEATSHIRT | JOHN@AOL.COM; MARY@AOL.COM |
| T-0002 | C-22222 | $30.00 | MOD-9999 | 56K MODEM | BILL GREENE |
| T-0003 | C-1111 | $40.00 | BAT-0000 | BASEBALL BAT | 203.555.1234 |

SYSTEMS AND METHODS FOR PROVIDING TRANSFERABLE ITEM PRICES

CLAIM OF PRIORITY

The present application is a continuation application of U.S. patent application Ser. No. 09/538,750, filed Mar. 30, 2000 now abandoned and entitled SYSTEMS AND METHODS FOR PROVIDING TRANSFERABLE ITEM PRICES.

CROSS-REFERENCES TO RELATED APPLICATIONS

The present application is related to: U.S. patent application Ser. No. 08/943,483 entitled "System and Method for Facilitating Acceptance of Conditional Purchase Offers (CPOs)" and filed on Oct. 3, 1997, which is a continuation-in-part of U.S. patent application Ser. No. 08/923,683 entitled "Conditional Purchase Offer (CPO) Management System For Packages" and filed Sep. 4, 1997, which is a continuation-in-part of U.S. patent application Ser. No. 08/889,319 entitled "Conditional Purchase Offer Management System" and filed Jul. 8, 1997, which is a continuation-in-part of U.S. patent application Ser. No. 08/707,660 entitled "Method and Apparatus for a Cryptographically Assisted Commercial Network System Designed to Facilitate Buyer-Driven Conditional Purchase Offers" filed on Sep. 4, 1996 and issued as U.S. Pat. No. 5,794,207 on Aug. 11, 1998; U.S. patent application Ser. No. 09/282,747 entitled "Method and Apparatus for Providing Cross-Benefits Based on a Customer Activity" and filed Mar. 31, 1999; now abandoned U.S. patent application Ser. No. 09/533,087 entitled "Systems and Methods for Providing a Benefit From a Third Party During a Transaction" and filed Mar. 22, 2000; U.S. patent application Ser. No. 09/504,180 entitled "Systems and Methods Using a Representation of a Stored Benefit to Facilitate a Transaction" and filed Feb. 15, 2000; U.S. patent application Ser. No. 09/337,906 entitled "Purchasing Systems and Methods Wherein a Buyer Takes Possession at a Retailer of a Product Purchased Using a Communication Network" and filed Jun. 22, 1999, which is a continuation-in-part of U.S. patent applications Ser. No. 08/889,503 entitled "System and Process for Local Acquisition of Products Priced Online" and filed Jul. 8, 1997; and now abandoned U.S. patent application Ser. No. 09/526,575 entitled "Systems and Methods to Price an Item for a Customer Based on Price Management Data" and filed Mar. 16, 2000. The entire contents of these application are incorporated herein by reference.

Field

The present invention relates to commerce. In particular, the present invention relates to systems and methods for providing transferable item prices.

Background

A merchant who offers an item for sale may face significant competition from other merchants to attract and retain consumers. This may be especially true for online merchants (e.g., merchants who sell items via the World Wide Web), because a consumer can more readily "shop around" to determine item prices offered by different online merchants.

One way of responding to this competition is to reduce the price at which an item is offered for sale (e.g., by discounting the retail price for all consumers). Unfortunately, reducing the item price also reduces the merchant's profit, and the reduced profit may not be offset by an increase in sales. To minimize such a result, a number of other techniques have been used to determine an item price for a consumer.

For example, some merchants distribute coupons and/or establish pricing tiers (e.g., via frequent shopper programs) that let some consumers pay a reduced item price while other consumers pay a higher item price. Manufacturers also use similar techniques (e.g., via manufacturer rebates) to determine an item price.

A merchant may also offer an item for sale at a "dynamic" item price. For example, the item price may increase or decrease over time according to a predetermined schedule (e.g., the item price may automatically decrease 10% each week until all of the items in stock have been sold). Similarly, the item price may increase or decrease based on a number of consumers who purchase the item or the number of items that are sold (e.g., the item price is $100 for the first fifty consumers and $120 for all other consumers).

The item price may also vary based on revenue management information (e.g., supply and demand information) as described, for example, in now abandoned U.S. patent application Ser. No. 09/526,575 entitled "Systems and Methods to Price an Item for a Customer Based on Price Management Data". Note that the item price may even be adjusted after a consumer has purchased the item (e.g., the item price will be $100 if less than fifty consumers purchase the item and $80 if at least fifty consumers purchase the item via the merchant).

Other merchants offer items for sale at consumer-established item prices. For example, a merchant may conduct an auction and sell the item to the twenty highest bidders.

U.S. Pat. No. 5,794,207 entitled "Method and Apparatus for a Cryptographically Assisted Commercial Network System Designed to Facilitate Buyer-Driven Conditional Purchase Offers" discloses another approach in which a consumer submits an offer, including a consumer-established offer price. The offer may be "binding," for example, in that the consumer cannot revoke the offer after it has been accepted by a seller (or a penalty may be applied to the consumer if he or she revokes the offer).

A merchant may also vary an item price based on a subsidy to be applied to a transaction. For example, a third party may agree to apply a benefit to a transaction if a consumer agrees to perform a task (e.g., a credit card company may agree to contribute $30.00 towards an item price if the consumer is approved for a new credit card). Some examples of such subsidies are disclosed in U.S. patent application Ser. No. 09/282,747 entitled "Method and Apparatus for Providing Cross-Benefits Based on a Customer Activity."

Note that with each of these above techniques, a merchant associates an item price with a consumer. That is, the merchant may sell an item to different consumers at different item prices.

The above techniques suffer from a number of disadvantages. For example, consider a merchant who associates a particular item price with a consumer. If the consumer does not purchase the item for any reason (e.g., the consumer is unable or unwilling to purchase the item), the merchant will lose any chance to earn the profit that would result from a sale at that particular price. This may be the case even when the consumer knew of a friend who wanted to purchase the item at that price.

Even if the consumer did purchase the item, the merchant may welcome additional sales at that particular price (e.g., if that price will provide the merchant with a reasonable profit). However, because that particular price is only associated with that consumer, other consumers will be unaware that they could also purchase the item at that price. Note that broadcasting the particular price to all potential consumers might undermine the pricing system established by the merchant (e.g., the merchant may expect that at least some consumers will pay even more than that price for the item).

Even when the particular price does not provide the merchant with a reasonable profit (e.g., the merchant only "breaks even" or even loses money with each sale), the merchant may want to allow other consumers to purchase the item at that price. For example, the merchant may consider the marketing benefits associated with having a consumer refer his or her friends to the merchant's Web site (e.g., as opposed to telling them "I got a good price through this merchant, but you may or may not get the same price"). Moreover, the merchant may want to avoid any confusion or bad feelings that may arise when a consumer's friend visits the merchant (e.g., accesses a Web site associated with the merchant) only to find that he or she is unable to purchase the item at the same price.

A need exists, therefore, for further systems and methods to facilitate transactions with consumers.

SUMMARY

To alleviate problems inherent in the prior art, the present invention introduces systems and methods for providing transferable item prices.

In one embodiment of the present invention, a transferable item price is associated with a first consumer, and it is determined that a second consumer is entitled to purchase an item in exchange for payment of an amount based on the transferable item price.

Another embodiment of the present invention comprises: means for associating a transferable item price with a first consumer; and means for determining that a second consumer is entitled to purchase an item in exchange for payment of an amount based on the transferable item price.

With these and other advantages and features of the invention that will become hereinafter apparent, the nature of the invention may be more clearly understood by reference to the following detailed description of the invention, the appended claims and the several drawings attached herein.

BRIEF DESCRIPTION OF THE DRAWINGS

FIG. 4 is a tabular representation of a portion of a transferable item price code database according to an embodiment of the present invention.

FIG. 5 is a tabular representation of a portion of a secondary consumer database according to an embodiment of the present invention.

DETAILED DESCRIPTION

Figure 1:
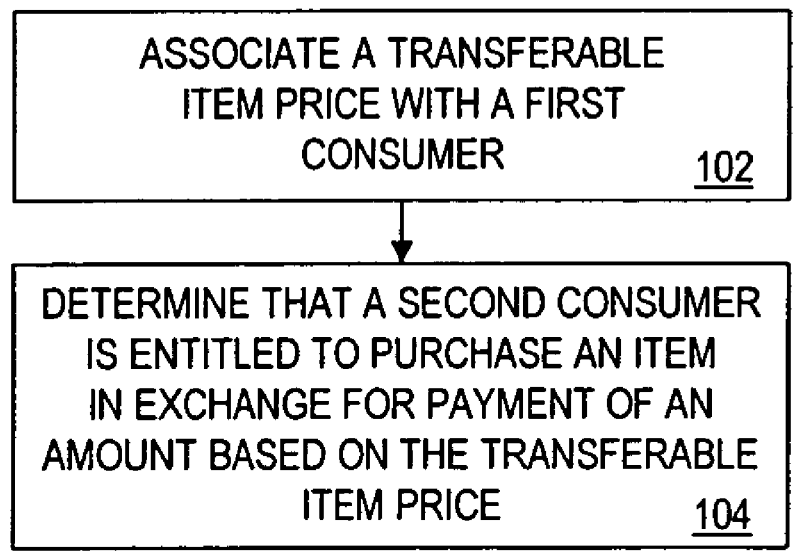
FIG. 1 is a flow chart of a method for processing a transaction according to an embodiment of the present invention.

Turning now in detail to the drawings, FIG. 1 is a flow chart of a method for processing a transaction according to an embodiment of the present invention. At 102, a transferable item price is associated with a first "consumer." As used herein, a consumer may be any party (e.g., an individual, a group of individuals, or a business) that purchases an item, indicates an interest in purchasing an item, or otherwise arranges to be associated with a transferable item price.

The transferable item price may represent, for example, a price at which a merchant is willing to sell an "item" to the first consumer (e.g., by directly selling the item to the first consumer or by arranging for a seller to sell the item to the first consumer). As used herein, an item may be any product or service, or interest in a product or service (e.g., a license), that can be purchased by a consumer. By way of example, an item may be a ticket (e.g., an airline or concert ticket), a hotel room, a consumer electronics device, a software program or other information, a book, a grocery item, a gallon of gasoline, or a used item (i.e., "second-hand" item). In addition, as used herein, the merchant may be any party (e.g., an individual, a group of individuals, or a business) that can sell an item to a consumer.

At 104, it is determined that a second or "secondary" consumer (e.g., a consumer other than the first consumer) is entitled to purchase an item in exchange for payment of an amount based (i.e., based at least in part) on the transferable item price. In this way, the first consumer is able to "transfer" his or her item price to the second consumer. Note that not every consumer is entitled to purchase the item from the merchant at the transferable item price (e.g., the transferable item price does not represent a static retail price at which the merchant typically sells the item).

Figure 2A:
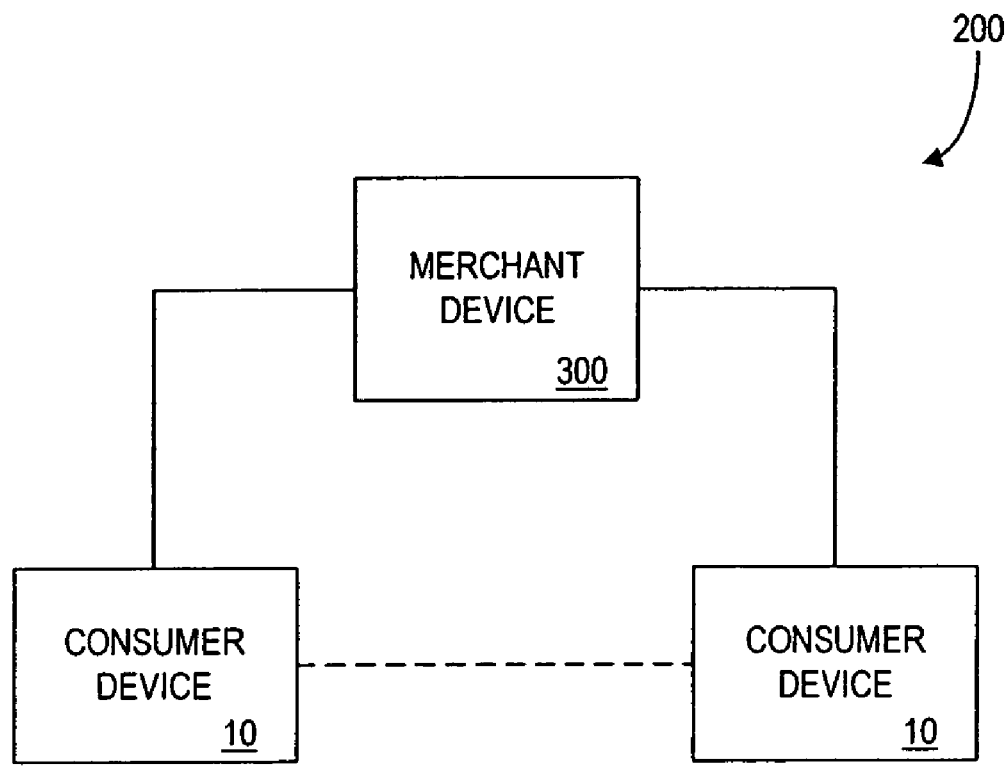
FIG. 2A is a block diagram overview of a transaction system according to an embodiment of the present invention.

FIG. 2A is a block diagram overview of a transaction system 200 according to an embodiment of the present invention. The transaction system 200 includes a merchant device 300 in communication with a number of consumer devices 10. As used herein, a device (including the consumer device 10, the merchant device 300, and/or any other devices) may communicate, for example, via a communication network such as a Local Area Network (LAN), a Wide Area Network (WAN), a Metropolitan Area Network (MAN), a Public Switched Telephone Network (PSTN), an&or an Internet Protocol (IP) network such as the Internet, an intranet or an extranet. Moreover, as used herein, a communication network includes those enabled by wired or wireless technology.

In one embodiment of the present invention, a consumer device 10 communicates with a remote Web-based merchant device 300 (e.g., a server) via the Internet. Although embodiments of the present invention will be described with respect to information exchanged via the Internet, according to other embodiments information is exchanged via, for example, a wired or wireless telephone, an Interactive Voice Response Unit (IVRU), postal mail, e-mail, a WEBTV® interface, a cable network interface, and/or a wireless device.

The consumer device 10 may be, for example, a Personal Computer (PC), a portable computing device such as a Personal Digital Assistant (PDA), a wired or wireless telephone, a one-way or two-way pager, a kiosk, an Automated Teller Machine (ATM) device, a Point Of Sale (POS) terminal (e.g., a cash register or gasoline pump), a smart card, a magnetic strip card, and/or any other appropriate communication or storage device. Note that the consumer devices 10 shown in FIG. 2A may represent a number of different types of devices (e.g., some consumers may use PCs while others use telephones).

Any of the consumer device 10, the merchant device 300, and/or the other devices described herein may be incorporated in a single device. For example, a kiosk at a merchant's store may act as both the consumer device 10 and the merchant device 300.

As will be explained, the transaction system 200 may be used to facilitate a transaction in which a consumer purchases an item.

Consider a first consumer who uses his or her consumer device 10 to indicate an interest in purchasing an item. For example, the first consumer may use his or her PC to arrange to purchase an item via a merchant's Web site at a first item price (e.g., a price different than a retail price at which the merchant typically sells the item). The merchant device 300 associates the first item price with the first consumer (e.g., by storing an indication of the first item price and an indication of the first consumer in a database).

According to one embodiment, the merchant device 300 transmits a transferable item price code to the consumer device 10 associated with the first consumer. For example, the merchant device 300 may transmit an e-mail message, including the transferable item price code, to the first consumer's PC.

The transferable item price code may be an encoded or encrypted code associated with a particular transaction between the first consumer and the merchant. For example, the transferable item price code may be a verifiable "hash" value generated when transaction information is used with a hash function, such as a one-way hash function. A hash function is a transformation that takes input information and returns a hash value. In general, one can think of a hash value as a "digital fingerprint" of the input information. For example, the input information to the hash function may be a transaction identifier and the first item price. In this case, the hash function would generate the transferable item price code based on the input information. The merchant device 300 could then verify such a transferable item price code using an associated function. According to one embodiment, the merchant device 300 receives both transaction information (e.g., a transaction identifier and an indication of a transferable item price) and a transferable item price code, and uses the transferable item price code to verify the transaction information. Such an embodiment may prevent a consumer from using a modified transferable item price. Applicable hash functions and other encryption techniques are described in Bruce Schneier, "Applied Cryptography: Protocols, Algorithms, and Source Code in C" (John Wiley & Sons, Inc., 2nd Ed. 1996).

The first consumer then forwards the e-mail message to another consumer, or a "secondary" consumer (e.g., as shown by a dashed line in FIG. 2A), and the secondary consumer supplies the transferable item price code to the merchant device 300 (e.g., when the secondary consumer accesses the merchant's Web site). Based on the received transferable item price code, the merchant device 300 determines that the secondary consumer is entitled to purchase an item (e.g., an identical item or a similar item) in exchange for payment of an amount based on the first item price. Note that the secondary consumer may also be allowed to forward the transferable item price code to other consumers.

According to another embodiment, the first consumer transmits an identifier associated with the secondary consumer to the merchant device 300. For example, the first consumer may transmit an e-mail address associated with his or her friend to the merchant device 300. In this case, either the first consumer or the merchant device 300 may transmit information to the secondary consumer indicating that he or she is now entitled to purchase the item at the first item price.

According to one embodiment, a transferable item price code is also transmitted to the secondary consumer.

The secondary consumer then supplies the same identifier to the merchant device 300 (e.g., by entering his or her e-mail address when accessing the merchant's Web site). Based on the secondary consumer's identifier, the merchant device 300 determines that the secondary consumer is entitled to purchase an item in exchange for payment of an amount based on the first item price.

According to still another embodiment, the secondary consumer instead transmits an identifier associated with the first consumer to the merchant's Web site. For example, the secondary consumer may supply his or her friend's e-mail address to the merchant device 300. Based on the identifier associated with the first consumer, the merchant device 300 determines that the secondary consumer is entitled to purchase an item in exchange for payment of an amount based on the first item price.

Figure 2B:
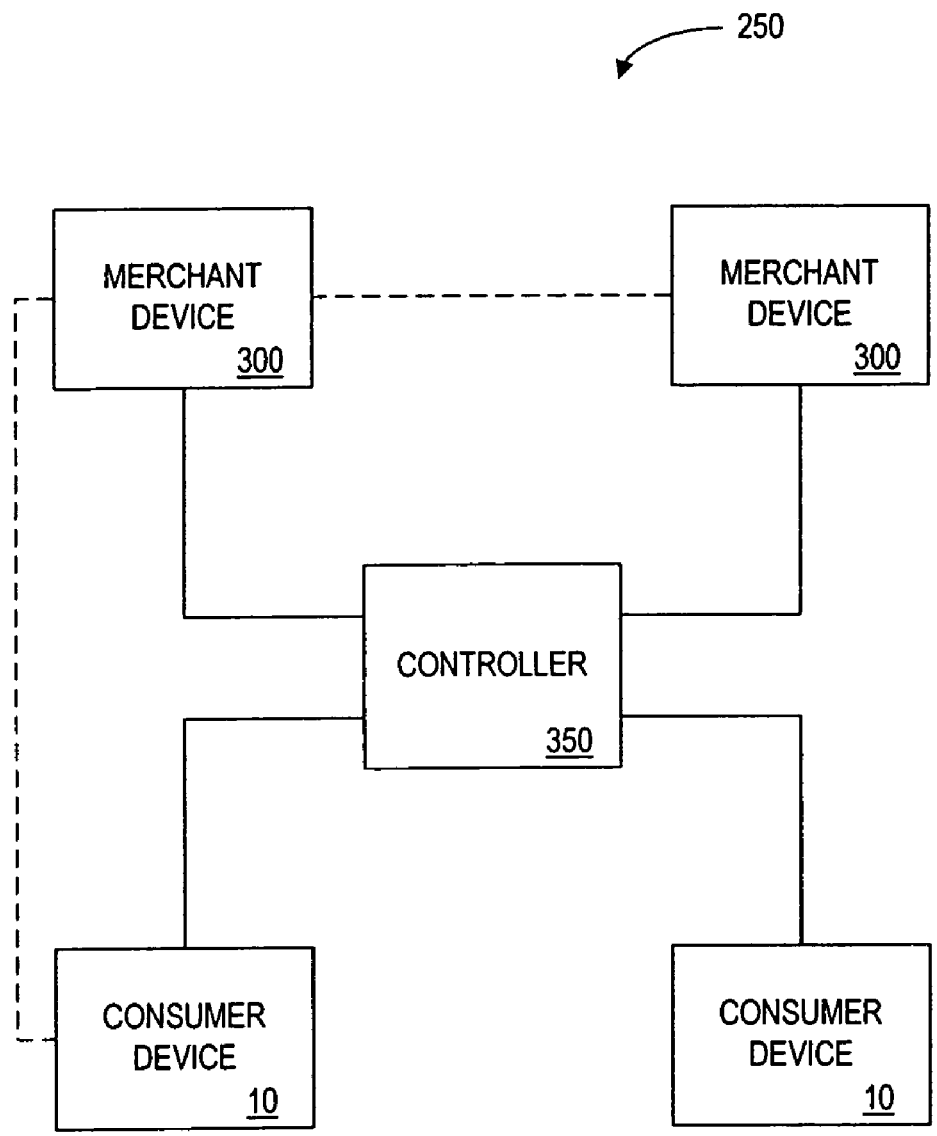
FIG. 2B is a block diagram overview of a transaction system according to another embodiment of the present invention.

FIG. 2B is a block diagram overview of a transaction system 250 according to an embodiment of the present invention. As shown in FIG. 2B, a controller 350 may communicate with one or more consumer devices 10 and/or one or more merchant devices 300. The controller 350 may be used, for example, to allow a second merchant (e.g., another retail store) to determine that a secondary consumer is entitled to purchase an item at a transferable item price established between a first consumer and a first merchant. For example, the controller 350 may generate and/or validate a transferable item price code. Similarly, the controller 350 may enable the second merchant to determine that the first consumer is entitled to purchase an item at a transferable item price established between the first consumer and the first merchant.

As shown by a dashed line in FIG. 2B, a consumer device 10 may communicate directly with a merchant device 300. For example, a consumer's PDA may transmit a transferable item price code directly to a merchant's POS terminal. Similarly, a merchant device 300 associated with a first merchant may communicate directly with a merchant device 300 associated with a second merchant. For example, the first merchant may transmit (e.g., on a periodic or non-periodic basis) a list of valid transferable item price codes to the secondary merchant.

Merchant Device

Figure 3:
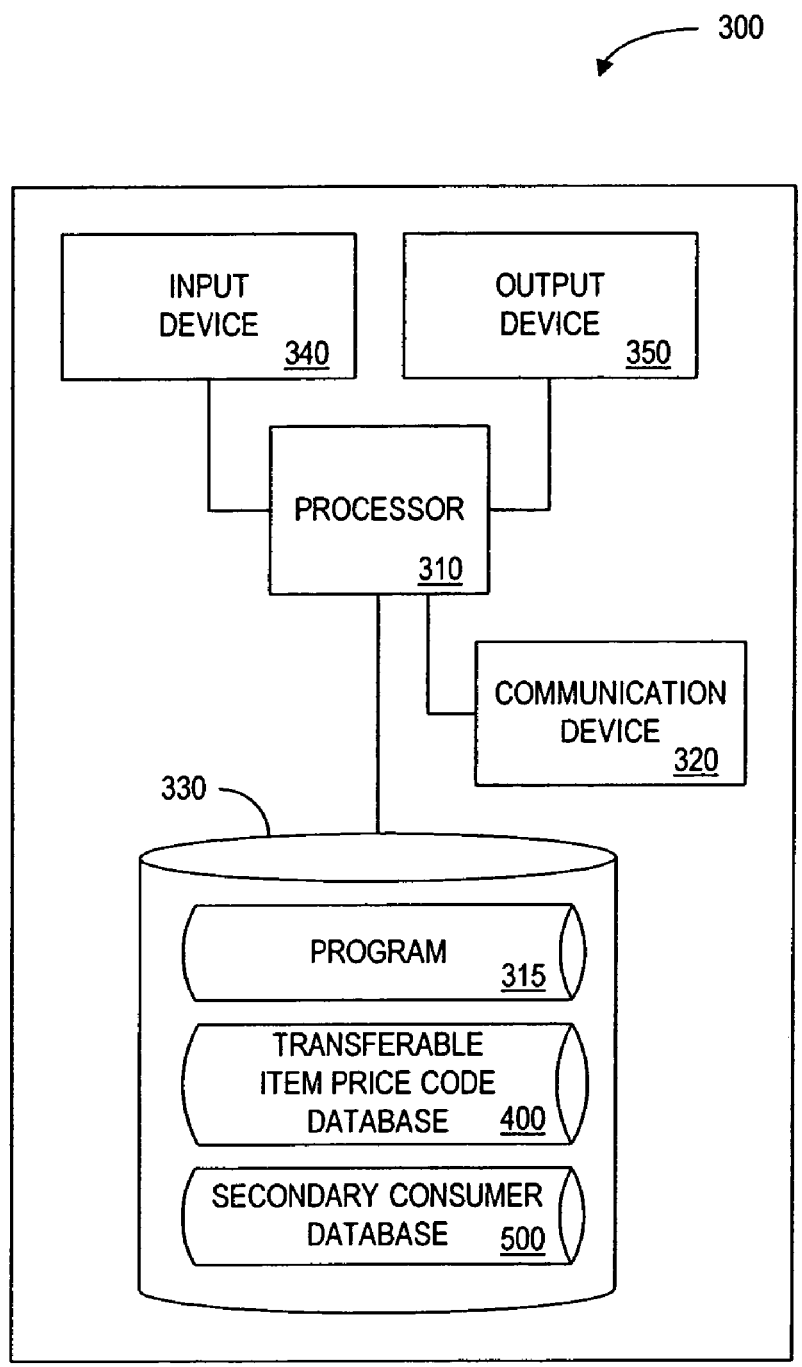
FIG. 3 is a block schematic diagram of a merchant device according to an embodiment of the present invention.

FIG. 3 illustrates a merchant device 300 that is descriptive of the device shown in FIGS. 2A and 2B according to one embodiment of the present invention. Note that the controller 350 may contain similar elements and/or perform similar functions as those described herein with respect to the merchant device 300.

The merchant device 300 comprises a processor 310, such as one or more INTEL® Pentium® processors, coupled to a communication device 320 configured to communicate through a communication network (not shown in FIG. 3). Note that the merchant device 300 may comprise a single computer, a network, or any other device capable of performing the functions described herein. The communication device 320 may be used to communicate, for example, with one or more consumer devices 10, a controller 350, and/or one or more other merchant devices 300.

The processor 310 also communicates with an input device 340 and an output device 350. The input device 340 may be used, for example, to receive a transferable item price code from a secondary consumer. Some examples of appropriate input devices 340 include a keypad, a pointer such as a mouse, and/or a microphone. The output device 350 may be used, for example, to transmit a transferable item price code to a first consumer. Some examples of appropriate output devices 340 include a printer, a display monitor, and/or a speaker. Note according to one embodiment, the transferable item price code is transmitted or received in human-recognizable format (e.g., as a series of alphanumeric characters).

The processor 310 is also in communication with a storage device 330. The storage device 330 may comprise any appropriate storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 330 stores a program 315 for controlling the processor 310. The processor 310 performs instructions of the program 315, and thereby operates in accordance with the present invention. For example, the processor 310 may associate a transferable item price with a first consumer and determine that a second consumer is entitled to purchase an item in exchange for payment of an amount based on the transferable item price.

The program 315 may be stored in a compressed, uncompiled, and/or encrypted format. The program 315 furthermore includes program elements that may be necessary, such as an operating system, a database management system, and/or "device drivers" used by the processor 310 to interface with peripheral devices. Appropriate program elements are known to those skilled in the art.

Note that the processor 310 and the storage device 330 may be, for example, located entirely within a single computer or other computing device or located in separate devices coupled through a communication channel. In one embodiment, the merchant device 300 comprises one or more computers that are connected to a remote database server.

As used herein, information may be "received" by or "transmitted" to, for example, (i) the merchant device 300 from a consumer device 10, or (ii) a software application or module within the merchant device 300 from another software application, module or any other source.

As shown in FIG. 3, the storage device 330 also stores a transferable item price code database 400 (described with respect to FIG. 4) and a secondary consumer database 500 (described with respect to FIG. 5). Examples of databases that may be used in connection with the transaction system 200 will now be described in detail with respect to FIGS. 4 and 5.

Note that only one of the two databases 400, 500 may be used according to some embodiments of the present invention. In particular, the transferable item price code database 400 may be used, for example, when the merchant device 300 determines that a secondary consumer is entitled to purchase an item at a transferable item price based on a transferable item price code (e.g., a transferable item price code transmitted to the first consumer and received from the secondary consumer). The secondary consumer database 500 may be used, for example, when the merchant device 300 determines that a secondary consumer is entitled to purchase an item at a transferable item price based on a consumer identifier, associated with the secondary consumer, received from the first consumer.

Each of FIGS. 4 and 5 depict a database in which the data is organized according to a data structure in accordance with embodiments of the present invention. The data may be stored, for example, on a computer readable medium and be accessible by a program executed on a data processing system. The schematic illustrations and accompanying descriptions of the databases presented herein are exemplary, and any number of other database arrangements could be employed besides those suggested by the figures.

Transferable Item Price Code Database

Referring to FIG. 4, a table represents the transferable item price code database 400 that may be stored at the merchant device 300 shown in FIGS. 2A and 2B according to an embodiment of the present invention. Note that some or all of the information shown in FIG. 4 may also be stored at the controller 350 and/or the consumer device 10.

The table includes entries identifying transactions between a first consumer and a merchant. As used herein, a "transaction" may include any interaction between the first consumer and the merchant. A transaction may involve, for example, the first consumer purchasing an item from the merchant. A transaction may instead involve the first consumer simply establishing an item price with the merchant.

The table also defines fields 402, 404, 406, 408, 410, 412 for each of the entries. The fields specify a transaction identifier 402, a consumer identifier 404, a transferable item price 406, an item identifier 408, an item description 410, and a transferable item price code 412.

The transaction identifier 402 may be, for example, an alphanumeric code generated by the merchant device 300 to represent an interaction between the first consumer and the merchant.

The consumer identifier 404 may be, for example, an alphanumeric code associated with the first consumer. According to one embodiment, the consumer identifier 404 is generated by the merchant device 300 when a consumer registers with the merchant. According to another embodiment, the consumer identifier 404 is generated by the consumer (e.g., when he or she creates a user name and password). The consumer identifier 404 may also be, for example, an address (e.g., a postal address, an e-mail address, or an IP address), a payment identifier (e.g., a credit card number, a debit card number, a banking account number, or digital payment protocol information) or a telephone number.

The transferable item price 406 represents an item price that the merchant has associated with the first consumer. For example, the first consumer may have offered to purchase a NIKON® camera having an average retail price of $300 (e.g., an average retail price with respect to a number of merchants and/or a period of time) in exchange for payment of a consumer-established transferable item price of $270. According to an embodiment of the present invention, a secondary consumer may also be entitled to purchase the camera in exchange for payment of $270.

The item identifier 408 may be, for example, an alphanumeric code associated with an item that the first consumer purchases, or is indicates an interest in purchasing, in exchange for the transferable item price 406. Similarly, the item description 410 may be any text, image, and/or audio information associated with the item. According to one embodiment, the item identifier 408 is associated with a particular item (e.g., a 27 inch screen SONY® television model number 1234, or the particular exercise bike owned by Mr. Smith). According to another embodiment, the item identifier 408 may be associated with a type of item (e.g., a 27 inch screen television made by any manufacturer). In this case, particular features associated with the type of item may also be stored in the transferable item price code database 400 (e.g., remote control, picture-in-picture capability).

The transferable item price code 412 may be, for example, an alphanumeric code associated with transferable item price 406. According to one embodiment, the transferable item price code 412 is generated by the merchant device 300 when the merchant associates the transferable item price 406 with the first consumer. According to another embodiment, the transferable item price code 412 is generated by the first consumer. The transferable item price code 412 may be based on, or associated with, the transaction identifier 402, the consumer identifier 404, the transferable item price 406, the item identifier 408, a secondary consumer identifier, a merchant identifier, and/or a date associated with the transaction.

Transferable Item Price Code Database

Referring to FIG. 5, a table represents the secondary consumer database 500 that may be stored at the merchant device 300 shown in FIGS. 2A and 2B according to an embodiment of the present invention. Note that some or all of the information shown in FIG. 5 may also be stored at the controller 350 and/or the consumer device 10.

The table includes entries identifying transactions between a first consumer and a merchant. The table also defines fields 502, 504, 506, 508, 510, 512 for each of the entries. The fields specify a transaction identifier 502, a consumer identifier 504, a transferable item price 506, an item identifier 508, and an item description 510. Each of these fields may be generated and represent information as described with respect to fields 402, 404, 406, 408, 410 in FIG. 4.

The secondary consumer identifier(s) 512 may be, for example, an alphanumeric code (e.g., a name, an e-mail address, or a telephone number) associated with one or more secondary consumers who are entitled to purchase the item associated with the item identifier 508 in exchange for the transferable item price 506.

The secondary consumer identifier(s) 512 may be based on, for example, information received from the first consumer. The secondary consumer identifier(s) 512 may also be based on, for example, a consumer identifier 504 and/or a payment identifier associated with the secondary consumer.

Methods that may be used in connection with the transaction system 200 according to an embodiment of the present invention will now be described in detail with respect to FIGS. 6 and 7.

Transaction System Methods

Figure 6:
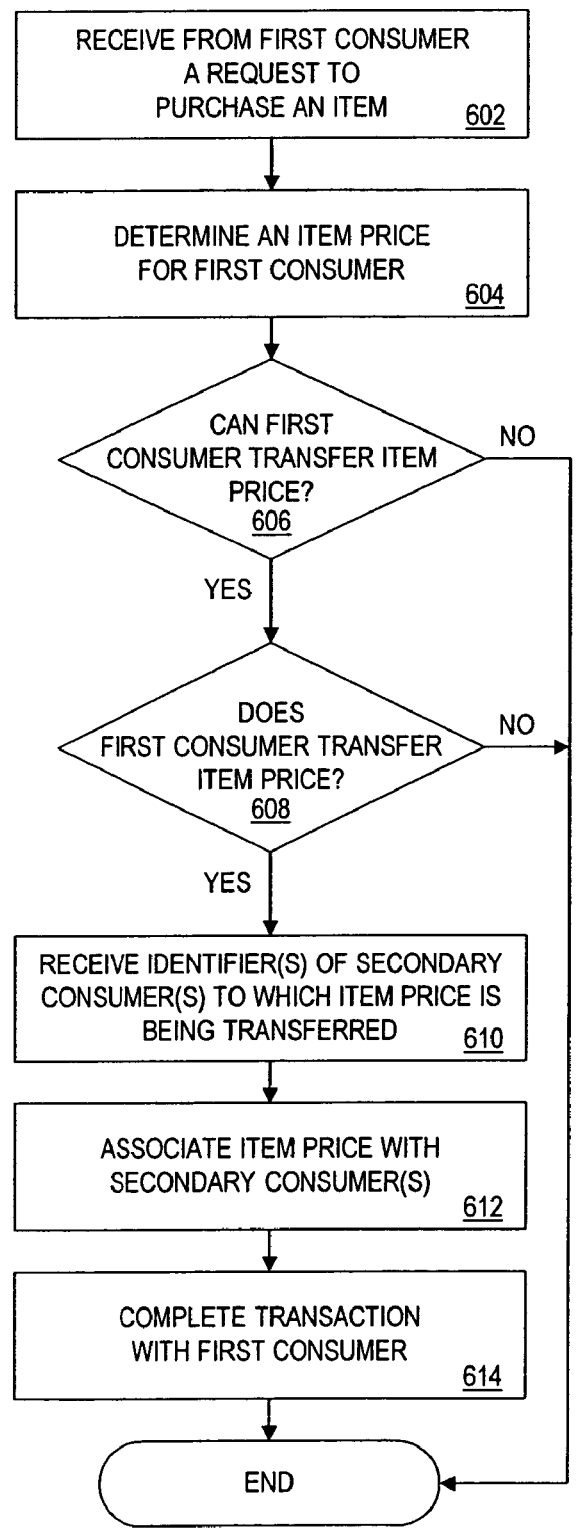
FIG. 6 is a flow chart illustrating a method for providing transferable item prices according to an embodiment of the present invention.

FIG. 6 is a flow chart of a transaction method according to an embodiment of the present invention. The method shown in FIG. 6 may be performed, for example, by the merchant device 300 when a first consumer arranges to purchase an item. The flow chart in FIG. 6, as well as the other flow charts discussed herein, does not imply a fixed order to the steps, and embodiments of the present invention may be practiced in other orders.

At 602, a request to purchase an item is received from a first consumer. According to an embodiment of the present invention, the request may comprise any indication that the first consumer is interested in purchasing the item.

The indication may be, for example, a request for an item price. For example, a consumer shopping in a store may use his or her PDA (e.g., his or her consumer device 10) to generate an item price request. According to other embodiments, the indication may be a request to purchase the item or an indication that the consumer is accessing information about the item (e.g., is viewing information about the item via his or her PDA).

Other indications that the consumer is interested in purchasing the item may be, for example: information stored at the consumer device 10, an indication from an input device associated with the consumer (e.g., that the consumer has scanned a bar code printed on an item), an indication that the consumer is viewing information about the item, an indication that the consumer has viewed information about the item for a predetermined period of time, an indication that the consumer is providing payment for the item (e.g., a credit card number), an indication that the item is in a shopping cart (including a conventional or virtual shopping cart), a search term, an indication that the consumer is purchasing the item from another merchant, a bid for the item (e.g., in an auction for the item), and an indication that another consumer is also interested in purchasing the item (e.g., another consumer has submitted a higher bid for the item).

The indication may also reflect that the consumer is not interested in purchasing the item at this time. For example, the indication may reflect that the consumer is no longer interested in purchasing the item (e.g., has removed the item from his or her virtual shopping cart), that the consumer is not going to purchase the item at an original price, or that the consumer is interested in purchasing another item (e.g., a similar item made by another manufacturer). Note that, as described herein, circumstances besides the actual purchase of an item may result in a transferable item price being associated with a consumer.

According to one embodiment, the request to purchase the item comprises an offer to purchase the item. For example, the consumer may submit an offer including a consumer-established item price (e.g., a consumer-established item price that he or she entered or selected from a list of suggested prices).

At 604, an item price (e.g., the transferable item price 406) is determined and associated with the first consumer. According to one embodiment, the merchant device 300 retrieves a stored dynamic item price to be associated with the first consumer. For example, the item price may increase or decrease over time according to a predetermined schedule (e.g., the item price automatically decreases 10% each week until all of the items in stock have been sold). Similarly, the item price may increase or decrease based on the number of consumers who purchase the item (e.g., the item price is $100 for the first fifty consumers and $120 for all other consumers). The item price may also vary based on revenue management information (e.g., supply and demand information). Note that the item price can change even after a consumer agrees to purchase the item (e.g., the item price will be $100 if less than fifty consumers purchase the item and $80 if at least fifty consumers purchase the item via the merchant).

According to another embodiment, the item price is determined based on a consumer-established item price. For example, a merchant may conduct an auction and sell the item to the twenty highest bidders. According to another embodiment, the first consumer submits a binding offer, including a consumer-established offer price. According to one embodiment, the item price is only determined for the first consumer when his or her offer is accepted (e.g., accepted by the merchant).

According to another embodiment, the item price is determined based on a subsidy to be applied to a transaction. For example, a third party may apply a benefit to a transaction if the first consumer performs, or agrees to perform, a task (e.g., to apply for a new credit card or to transfer an item price to at least five friends).

According to still another embodiment, the item price is based on a price at which a third party offers to sell the same item or a similar item. For example, a merchant may advertise that it will automatically match the lowest price being offered by other merchants in a particular geographic region. In this case, the item price will vary based on the prices being offered by the other merchants.

According to one embodiment, a total price is associated with a set of items being purchased by the first consumer. In this case, the total price may be transferred to a secondary consumer.

At 606, it is determined if the first consumer can transfer the item price. For example, a merchant may only allow certain first consumers to transfer item prices. In this case, the determination may be based on information associated with the first consumer, such as an address, demographic information, psychographic information (e.g., information about attitudes, values, lifestyles and opinions), one or more prior transactions (e.g., a reputation score or a frequent shopper status), and/or a credit rating.

The determination of whether the item price can be transferred may also be based on information associated with the item. For example, the determination may be based on the particular item (e.g., only prices associated with books on a best-seller list may be transferred), a cost to the merchant (e.g., a price the merchant paid for the item including any overhead associated with selling the item), a retail price (a price at which consumers can typically purchase the item from one or more merchants and/or the manufacturer), a prior price associated with the item (e.g., indicating a price trend or volatility), a perceived value to the consumer, a rate at which the item (or a group of items) are being sold, the transferable item price, and/or a subsidy associated with the item. For example, according to one embodiment, an item price can only be transferred if the margin associated with the sale of the item at that price (e.g., the item price less the cost of the item to the merchant) is at least a predetermined amount (e.g., the merchant makes a minimum acceptable profit or loses no more than a maximum acceptable amount on each sale).

According to another embodiment, The determination of whether the item price can be transferred is based on payment of a transfer fee by the first consumer (e.g., a predetermined amount or a percentage of the item price). The determination may also be based a task performed by the first consumer (e.g., applying for a service, subscribing to a service, receiving information, or providing information).

At 608, it is determined if the first consumer wants to transfer the item price. For example, the first consumer may indicate that he or she wants to transfer an item price to one or more friends. According to one embodiment, the first consumer must indicate if an item price will be transferred before he or she learns if an offer to purchase an item has been accepted (e.g., accepted by the merchant or any other seller).

According to one embodiment, one or more consumer identifiers are received from the first consumer at 610 and stored in the secondary consumer database 500. The secondary consumer identifier(s) 512 represent other consumers who may be entitled to purchase the same item (or similar item) in exchange for payment of an amount based on the item price associated with the first consumer.

At 612, the first consumer's item price is then associated with the secondary consumers (e.g., by storing the secondary consumer identifier(s) 512 in association with the transferable item price 506).

Note that, according to another embodiment, a transferable item price code 412 is used instead of, or in addition to, the secondary consumer identifier(s) 512. For example, the transferable item price code 412 may be transmitted to the first consumer, who can then forward the information to one or more secondary consumers. Each secondary consumer can then submit the transferable item price code 412 to the merchant device 300 to establish that they too are entitled to purchase the item at the item price associated with the first consumer.

At 614, the transaction is completed. For example, the first consumer may purchase the item from the merchant in exchange for payment of an amount based on the item price associated with the first consumer.

According to an embodiment of the present invention, the first consumer and/or the secondary consumer may provide an additional payment to the merchant in exchange for the right to transfer the item price. According to another embodiment, the first consumer and/or the secondary consumer may instead be entitled to a benefit in exchange for an item price being transferred (e.g., a reduced item price, or a payment associated with an amount of profit earned by the merchant). Note that the additional payment and/or the benefit may be calculated based on information associated with the transaction (e.g., if the transferable item price is significantly lower than a retail price, the first consumer may be required to provide a higher additional payment in exchange for the ability to transfer that price to a secondary consumer).

Figure 7:
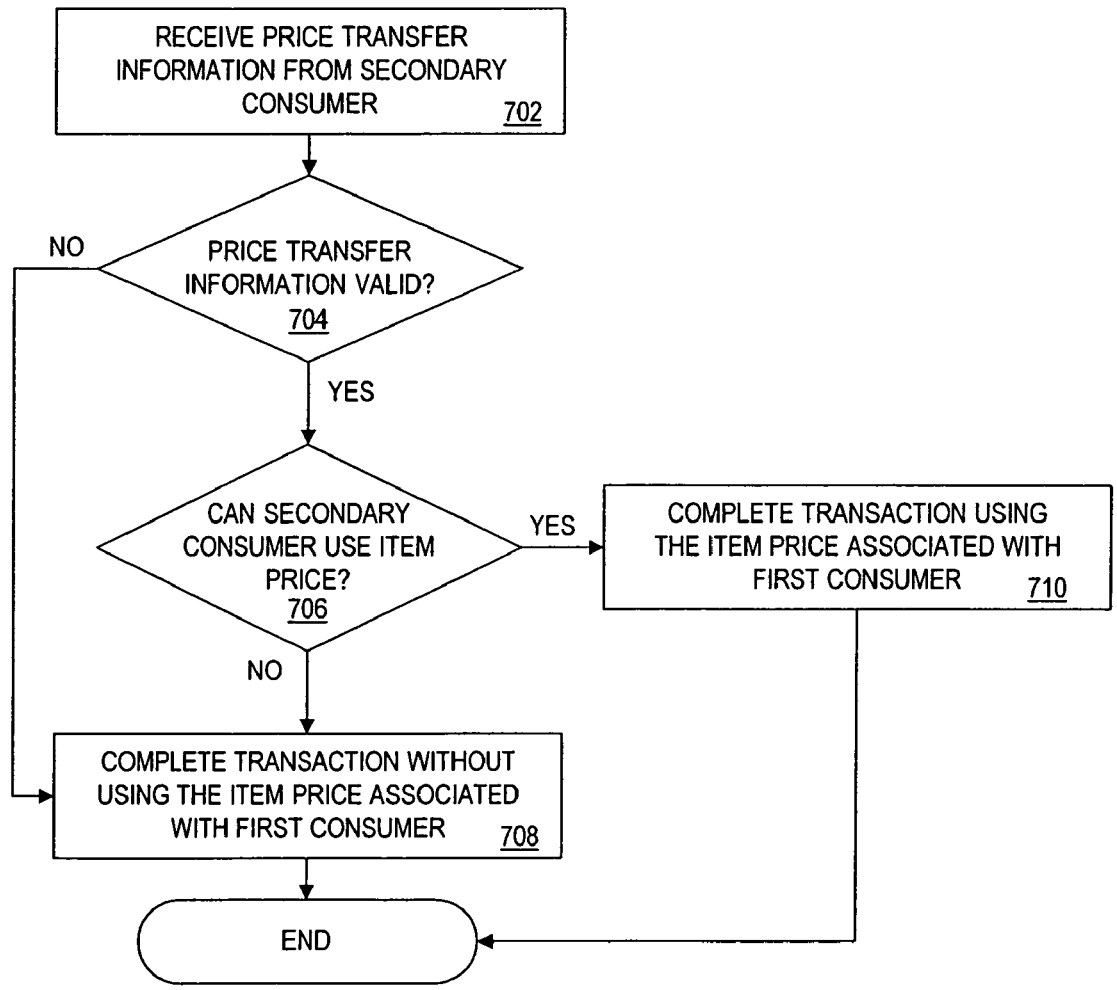
FIG. 7 is a flow chart illustrating a method for providing transferable item prices according to an embodiment of the present invention.

FIG. 7 is a flow chart of a transaction method according to an embodiment of the present invention. The method shown in FIG. 7 may be performed, for example, by the merchant device 300 when a secondary consumer arranges to purchase an item.

At 702, price transfer information is received from the secondary consumer. The price transfer information may comprise, for example, the transferable item price code 412, an item identifier 408, an identifier associated with the first consumer (e.g., the first consumer's user name), and/or an identifier associated with the secondary consumer (e.g., the secondary consumer's e-mail address).

At 704, it is determined if the price transfer information is valid. For example, the merchant device 300 may compare the received transferable item price code with codes stored in the transferable item price code database 400. According to another embodiment, the merchant device 300 may decrypt and verify the received transferable item price code. If the price transfer information comprises a consumer identifier, the merchant device 300 may compare the received consumer identifier with identifiers stored in the secondary consumer database (e.g., the consumer identifier 504 associated with the first consumer and/or the secondary consumer identifier(s) 512).

Note that if the price transfer information comprises a consumer identifier associated with the first consumer, the merchant device 300 may need to select one of a number of transferable item prices that have been associated with the first consumer (e.g., when the first consumer has purchased a particular item a number of times at different item prices). Similarly, if the price transfer information comprises a consumer identifier associated with the secondary consumer, the merchant device 300 may need to select one of a number of transferable item prices that have been associated with the secondary consumer (e.g., when different consumers have transferred different item prices to the secondary consumer). In either case, the merchant device 300 may select, for example, the lowest item price, the highest item price, or an average item price.

If the price transfer information is not valid at 704, the transaction is completed at 708 without using the item price associated with the first consumer (e.g., the merchant may establish a new item price with the secondary consumer).

If the price transfer information is valid at 704, it is determined if the secondary consumer can use the item price at 706. For example, a merchant may only allow certain consumers to use transferred item prices. In this case, the determination can be based on information associated with the secondary consumer, such as an address, demographic information, psychographic information, one or more prior transactions, and/or a credit rating.

The determination of whether the secondary consumer can use the transferable item price may also be based on information associated with the item. For example, the determination may be based on the particular item, a cost of the item to the merchant, a retail price, the transferable item price, and/or a subsidy associated with the item.

According to another embodiment, The determination of whether the secondary consumer can use the transferable item price is based on payment of a transfer fee by the secondary consumer. The determination may also be based on a task performed by the secondary consumer. For example, a transfer may be permitted only if the first consumer and the secondary consumer each answer five survey questions.

The determination of whether the secondary consumer can use the item price at 706 may also be based on one or more restrictions associated with the transfer. For example, some item prices may be transferable only within a predetermined period of time (e.g., within one month, before the end of the year, or on weekdays after 7:00 PM). An item price may also be limited within a certain geographic region (e.g., if the first consumer established an item price based on purchasing gasoline in New York, the secondary consumer may not be permitted to purchase gasoline at that price in California).

According to another embodiment, a transferable item price may be limited with respect to how many items may be purchased at that price. For example, the merchant may transmit a transferable item price code to the first consumer and indicate that up to five items may be purchased by friends at that price (e.g., if a first friend purchases three items then a second friend can only purchase two items). According to another embodiment, a transferable item price may be limited with respect to how many different secondary consumers can purchase items at that price. For example, the merchant may transmit a transferable item price code to the first consumer and indicate that up to five different friends can purchase items at that price. Note that a number of different restrictions may be combined. For example, no more than three friends may be allowed to use an item price, and each friend can purchase no more than five items (or $100 worth of items) at that price. Such approaches may discourage consumers from taking advantage of a transferable item price that is significantly lower than a retail price associated with the item.

According to one embodiment, each secondary consumer is limited to purchasing the same number of items that were purchased by the first consumer. According to another embodiment, each secondary consumer may purchase no more than the number of items that were purchased by the first consumer. Such approaches may discourage consumers from making a number of small "test" purchases in order to achieve a transferable item price that is significantly lower than a retail price associated with the item (and then taking advantage of the lower item price via a large secondary consumer purchase).

According to one embodiment, both the first consumer and the secondary consumer are entitled to purchase the item at the transferable item price. According to another embodiment, only one of the first consumer and the secondary consumer are entitled to purchase the item at the transferable item price (e.g., only the consumer who completes the transaction first is entitled to use the transferable item price). According to another embodiment, both the first consumer and the secondary consumer must purchase the item at the transferable item price.

If the secondary consumer cannot use the item price for any reason at 706, the transaction is completed at 708 without using the item price associated with the first consumer (e.g., the merchant may establish a new item price with the secondary consumer).

If the secondary consumer can use the item price at 706, the transaction is completed at 710 using the item price associated with the first consumer. For example, the merchant may arrange for the secondary consumer to purchase the item in exchange for payment of an amount based on the first consumer's item price.

Thus, embodiments of the present invention let a first consumer establish a price with a merchant and transfer that price to one or more secondary consumers. This ability may provide both of the consumers with a feeling of satisfaction (e.g., because he or she helped a friend and/or received a lower item price) and loyalty to the merchant.

ADDITIONAL EMBODIMENTS

The following are several examples which illustrate various embodiments of the present invention. These examples do not constitute a definition of all possible embodiments, and those skilled in the art will understand that the present invention is applicable to many other embodiments. Further, although the following examples are briefly described for clarity, those skilled in the art will understand how to make any changes, if necessary, to the above-described systems and methods to accommodate these and other embodiments of the present invention.

According to one embodiment of the present invention, a transaction term other than an item price is transferred from a first consumer to a secondary consumer. For example, first consumer may establish a financing term (e.g., a mortgage interest rate term), a warranty term, a delivery term, and/or a discount associated with a retail price (e.g., a predetermined discount amount or a percentage discount). According to other embodiments, the transaction term may comprise a probability that an offer will be accepted, an item quantity, and/or a particular item or type of item that is being purchased (e.g., a grade of gasoline). According to another embodiment, a first consumer may transfer a right or obligation regarding a subscription (e.g., an agreement to purchase one item a month for two years) to one or more secondary consumers.

According to another embodiment, the transaction term may represent an amount of money a consumer will receive in a transaction (instead of an item price a consumer will pay in a transaction). For example, a first consumer may arrange with a controller 350 to receive payment of $5 in exchange for answering thirty survey questions. The first consumer may then transfer the right to receive $5 in exchange for answering thirty survey questions to a secondary consumer. Similarly, a first consumer may arrange via the controller 350 to sell a used exercise bicycle for $60. In this case, a secondary consumer may be entitled to sell his or her similar exercise bicycle (e.g., having the same features and being in approximately the same condition) at that price.

As described herein, a transferable item price may be directly associated with a first consumer and/or a secondary consumer. According to one embodiment, a time associated with a transaction (e.g., a time at which an offer was made, an offer was accepted, or an item was purchased) may be associated with a first consumer and/or a secondary consumer. Consider, for example, an item price that varies over time (e.g., varies based on current supply and demand information). In this case, a first consumer may arrange to purchase an item at a particular time for a particular price (e.g., the price of a 32 oz. can of tomato sauce was $1.50 at 8:30 AM), and the particular time of the transaction may be associated with the first consumer and/or a secondary consumer. The merchant device 300 may then retrieve the item price associated with the particular time (e.g., the item price as of 8:30 AM) that has been transferred to the secondary consumer.

According to another embodiment, the transferable item price is dynamic (e.g., the transferable item price changes over time). For example, a transferable item price code may initially be associated with an item price of $100. The transferable item price, however, may automatically increase over time (e.g., by 10% each week) or as the transferable item price is used by other secondary consumers (e.g., by $2 each time the transferable item price is used).

According to one embodiment, the first consumer is prevented from using the transferable item price (e.g., the merchant device 300 may use a consumer identifier to ensure that the first consumer does not submit his or her transferable item price code at a later date). According to another embodiment, the first consumer is allowed to use the transferable item price. That is, the first consumer may reserve the transferable item price and use that price when he or she purchases the item at a later time (either from the same merchant or another merchant). In this case, the merchant device 300 may store the representation of the transferable item price code at a consumer device 10, such as by storing the representation as a "cookie" at the first consumer's PC. A cookie may be a block of data that a Web server (e.g., the controller 350) stores on a client system (e.g., the consumer device 10). When the first consumer returns to the same Web site, or an associated Web site, the browser of the consumer device 10 sends a copy of the cookie back to the Web server. Cookies may be used to identify consumers associated with the consumer device 10, to instruct the Web server to send a customized version of a Web page, to submit stored benefits associated with the buyer, and for other purposes.

According to another embodiment, the first consumer may not even be aware of the secondary consumer. For example, a merchant device 300 may arrange for the first consumer to purchase an item at a particular price. The merchant device 300 may then automatically send an indication to the secondary consumer (e.g., based on a pre-stored list or "team" of consumers, demographic information, or a random process) that he or she is also entitled to purchase the item at that price.

According to another embodiment, a transferable item price may be used by the secondary consumer retroactively. For example, consider a secondary consumer who purchases a software program from a merchant at an item price of $35. The secondary consumer then receives an e-mail from a friend, including a transferable item price code, indicating that he or she is entitled to use a transferable item price of $30. In this case, the secondary consumer may transmit the transferable item price code to the merchant and receive a $5.00 refund.

According to another embodiment, a number of different transferable item price codes may be transmitted to the first consumer. In this case, each transferable item price code may be usable only once or may be associated with a different transferable item price (e.g., a first code may transfer a $90 item price while a second code transfers a $95 item price).

According to another embodiment, the item price indicated to the secondary consumer is different than the item price indicated to the first consumer. For example, the average price of an item in a city where the secondary consumer lives may be significantly higher than the average price of the item in a city where the first consumer lives. In this case, a higher item price may be indicated to the secondary consumer. Similarly, a smaller amount of the item (e.g., eight gallons of gasoline instead of ten gallons or twenty-five minutes of long distance telephone calls instead of thirty minutes) or a lower quality item (e.g., gasoline having an octane rating of 87 instead of 92) may be indicated to the secondary consumer at the same item price.

As previously described, an item price may be transferable for a limited period of time (e.g., a transferable item price code may be associated with an expiration date). According to one embodiment, this period of time may be dynamic. For example, a transferable item price code transmitted to a first consumer may expire if it is not transferred within five days. When the first consumer transfers the transferable item price code to a secondary consumer, the expiration date may be adjusted so that the secondary consumer can use (or transfer) the transferable item price code for an additional five days. According to one embodiment, the expiration date may be based on information received from a merchant device 300 as the transferable item price code is transferred. In this way, the merchant device 300 may "turn off" a transferable item price code (e.g., when the transferable item price no longer provides an acceptable amount of profit to the merchant).

According to another embodiment, the merchant device 300 and/or the controller 350 may monitor the transfer of item prices between consumers. This information may be used, for example, to determine consumer demand for an item at different prices (e.g., to adjust an item price).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method of facilitating a transaction, comprising:
    determining a first transaction involving a first consumer and a merchant;
    determining a transferable item price established between the first consumer and the merchant during the first transaction;
    associating the transferable item price with the first consumer;
    determining, via a computing device, that the first consumer has transferred the transferable item price to a second consumer who was not involved in the first transaction, thereby determining that the second consumer is entitled to purchase, in a second transaction, an item in exchange for payment of an amount based on the transferable item price, wherein the determination that the second consumer is entitled to purchase the item in exchange for payment of the amount based on the transferable item price is based on information received from the second consumer; and
    transmitting a transferable item price code to the first consumer, wherein the transferable item price code is encrypted.

2. The method of claim 1, further comprising:
    determining the transferable item price associated with the first consumer.

3. The method of claim 2, wherein the determination of the transferable item price is based on an offer received from the first consumer to purchase the item in exchange for payment of an offer price, the transferable item price being based on the offer price.

4. The method of claim 3, wherein the offer received from the first consumer comprises a binding offer and the offer price is defined by the first consumer.

5. The method of claim 4, wherein the first consumer defines the offer price via:
    (i) entering the offer price, or (ii) selecting the offer price from a list of suggested prices.

6. The method of claim 5, wherein said associating is only performed if the offer received from the first consumer is accepted.

7. The method of claim 2, wherein the determination of the transferable item price is based on the first consumer purchasing the item in exchange for payment of a purchase price, wherein the transferable item price is based on the purchase price.

8. The method of claim 2, wherein the determination of the transferable item price is based on an auction bid received from the first consumer.

9. The method of claim 2, wherein the determination of the transferable item price is based on a price at which a third party offers to sell a similar item.

10. The method of claim 2, wherein an item price varies over time and the determination of the transferable item price is based on a time that the first consumer: (i) provides an offer, or (iii) purchases the item.

11. The method of claim 1, wherein the item is available for sale at a retail price and the transferable item price is different than the retail price.

12. The method of claim 1, wherein said associating comprises:
  determining if the transferable item price may be associated with the first consumer.

13. The method of claim 12, wherein the determination if the transferable item price may be associated with the first consumer is based on information associated with the first consumer.

14. The method of claim 13, wherein the information associated with the first consumer comprises at least one of: (i) an address, (ii) demographic information, (iii) psychographic information, (iv) a prior transaction, and (v) a credit rating.

15. The method of claim 12, wherein the determination if the transferable item price may be associated with the first consumer is based on information associated with the second consumer.

16. The method of claim 12, wherein the determination if the transferable item price may be associated with the first consumer is based on information associated with the item.

17. The method of claim 16, wherein the information associated with the item comprises at least one of: (i) the item, (ii) a cost associated with the item, (iii) a retail price associated with the item, (iv) the transferable item price, and (v) a subsidy associated with the item.

18. The method of claim 12, wherein the determination if the transferable item price may be associated with the first consumer is based on payment of a transfer fee amount by the first consumer.

19. The method of claim 12, wherein the determination if the transferable item price may be associated with the first consumer is based on a task to be performed by the first consumer.

20. The method of claim 19, wherein the task comprises at least one of: (i) applying for a service, (ii) subscribing to a service, (iii) receiving information, and (iv) providing information.

21. The method of claim 1, wherein the determination that the second consumer is entitled to purchase the item in exchange for payment of the amount based on the transferable item price is based on information received from the first consumer.

22. The method of claim 21, wherein the information received from the first consumer is received via at least one of: (i) an e-mail message, (ii) a Web page, (iii) a portable consumer device, (iv) personal digital assistant, (v) a telephone, (vi) an interactive voice response unit, (vii) a point of sale terminal, (viii) an automatic teller machine, and (ix) a kiosk.

23. The method of claim 21, wherein said determining comprises:
  receiving a consumer identifier from the first consumer, the consumer identifier being associated with the second consumer.

24. The method of claim 23, wherein the received consumer identifier comprises at least one of: (i) an e-mail address, (ii) a name, (iii) a postal address, (iv) a telephone number, (v) a user name, and (vi) a payment identifier.

25. The method of claim 23, further comprising:
  receiving from the second consumer a second consumer identifier; and
  comparing (i) the consumer identifier received from the first consumer and (ii) the second consumer identifier.

26. The method of claim 23, further comprising:
  transmitting a transferable item price code to the second consumer based on the consumer identifier received from the first consumer.

27. The method of claim 1, wherein the information received from the second consumer is received via at least one of: (i) an e-mail message, (ii) a Web page, (iii) a portable consumer device, (iv) personal digital assistant, (v) a telephone, (vi) an interactive voice response unit, (vii) a point of sale terminal, (viii) an automatic teller machine, and (ix) a kiosk.

28. The method of claim 1, further comprising:
  receiving the transferable item price code from the second consumer.

29. The method of claim 28, further comprising:
  verifying the transferable item price code received from the second consumer.

30. The method of claim 29, further comprising:
  comparing (i) the transferable item price code transmitted to the first consumer and (ii) the transferable item price code received from the second consumer.

31. The method of claim 1, wherein the transferable item price code is encrypted using a hash function.

32. The method of claim 1, wherein the transferable item price code indicates at least one of: (i) the transferable item price, (ii) the first consumer, (iii) the second consumer, and (iv) a transaction time.

33. The method of claim 1, wherein said determining comprises:
  receiving a consumer identifier from the second consumer, the consumer identifier being associated with the first consumer.

34. The method of claim 33, wherein the received consumer identifier comprises at least one of: (i) an e-mail address, (ii) a name, (iii) a postal address, (iv) a telephone number, (v) a user name, and (vi) a payment identifier.

35. The method of claim 33, further comprising:
  retrieving the transferable item price based on the consumer identifier received from the second consumer.

36. The method of claim 1, wherein the determination that the second consumer is entitled to purchase the item in exchange for payment of the amount based on the transferable item price is based on a restriction associated with the transferable item price.

37. The method of claim 36, wherein the restriction is based on information associated with the second consumer.

38. The method of claim 37, wherein the information associated with the second consumer comprises at least one of: (i) an address, (ii) demographic information, (iii) psychographic information, (iv) a prior transaction and (v) a credit rating.

39. The method of claim 36, wherein the restriction is based on information associated with the first consumer.

40. The method of claim 36, wherein the restriction is based on at least one of: (i) a predetermined date, and (ii) a predetermined period of time.

41. The method of claim 36, wherein the restriction is based on at least one of: (i) a predetermined number of consumers who use the transferable item price, (ii) a predetermined number of items sold at the transferable item price, and (iii) a predetermined monetary amount.

42. The method of claim 36, wherein the restriction is based on a task to be performed by at least one of: (i) the first consumer, and (ii) a second consumer.

43. The method of claim 42, wherein the task comprises at least one of: (i) applying for a service, (ii) subscribing to a service, (iii) receiving information, and (iv) providing information.

44. The method of claim 1, wherein the determination that the second consumer is entitled to purchase the item in exchange for payment of the amount based on the transferable item price is based on payment of a transfer fee amount by the second consumer.

45. The method of claim 1, wherein the first consumer is allowed to purchase the item at the transferable item price even if the second consumer purchases the item at the transferable item price.

46. The method of claim 1, wherein the first consumer is prevented from purchasing the item at the transferable item price if the second consumer purchases the item at the transferable item price.

47. The method of claim 1, wherein the transferable item price is dynamic.

48. The method of claim 47, wherein the transferable item price changes based on:
(i) a period of time, (ii) a number of consumers who use the transferable item price, and (iii) a number of items sold at the transferable item price.

49. The method of claim 1, further comprising:
arranging for the second consumer to purchase the item in exchange for providing payment of the amount based on the transferable item price.

50. The method of claim 49, further comprising:
providing a benefit to at least one of (i) the first consumer and (ii) the second consumer based on said arranging.

51. The method of claim 49, wherein the transferable item price is based on a purchase made by the first consumer, and the item purchased by the second consumer is different than an item purchased by the first consumer.

52. The method of claim 49, wherein the transferable item price is based on a purchase made by the first consumer, and a number of items purchased by the second consumer is different than a number of items purchased by the first consumer.

53. An apparatus for facilitating a transaction, comprising:
a processor; and
a storage device in communication with said processor and storing instructions adapted to be executed by said processor to:
determine a first transaction involving a first consumer and a merchant;
determine a transferable item price established between the first consumer and the merchant during the first transaction;
associate the transferable item price with the first consumer;
determine that the first consumer has transferred the transferable item price to a second consumer who was not involved in the first transaction, thereby determining that the second consumer is entitled to purchase, during a second transaction, an item in exchange for payment of an amount based on the transferable item price, wherein the determination that the second consumer is entitled to purchase the item in exchange for payment of the amount based on the transferable item price is based on information received from the second consumer; and
transmit a transferable item price code to the first consumer, wherein the transferable item price code is encrypted.

54. The apparatus of claim 53, wherein said storage device further stores at least one of: (i) transferable item price code database, and (ii) a second consumer database.

55. The apparatus of claim 53, further comprising:
a communication device coupled to said processor and adapted to communicate with at least one of: (i) a consumer device, (ii) a merchant device, and (iii) a controller.

56. A non-transitory computer readable medium storing instructions adapted to be executed by a processor to perform a method of facilitating a transaction, said method comprising:
determining a first transaction involving a first consumer and a merchant;
determining a transferable item price established between the first consumer and the merchant during the first transaction;
associating the transferable item price with the first consumer;
determining that the first consumer has transferred the transferable item price to a second consumer who was not involved in the first transaction, thereby determining that the second consumer is entitled to purchase, during a second transaction, an item in exchange for payment of an amount based on the transferable item price, wherein the determination that the second consumer is entitled to purchase the item in exchange for payment of the amount based on the transferable item price is based on information received from the second consumer; and
transmitting a transferable item price code to the first consumer, wherein the transferable item price code is encrypted.

* * * * *